UNITED STATES PATENT OFFICE.

AARON C. HORN, OF NEW YORK, N. Y.

PLASTIC WATERPROOFING COMPOSITION.

1,149,519. Specification of Letters Patent. Patented Aug. 10, 1915.

No Drawing. Application filed November 10, 1914. Serial No. 871,389.

*To all whom it may concern:*

Be it known that I, AARON C. HORN, a citizen of the United States, and a resident of New York, in the county of New York and State of New York, have invented a certain new and useful Plastic Waterproofing Composition, of which the following is a specification.

This invention relates to plastic troweling waterproof cements or compositions intended for waterproofing and decorating structural surfaces and the like, and to the process of making same, and relates especially to a pigment-containing cement having a high degree of plasticity or stiffly-fluent mobility, marked adhesiveness to structural surfaces, yet working freely and smoothly under the trowel without an undue measure of tackiness or "pull" which characterizes many resinous mixtures of similar body.

The treatment of structural surfaces of brick, concrete and other forms of masonry more or less porous and moisture transmitting in character to render same either impenetrable by moisture or to act as a moisture barrier usually resolves itself into the application to such surfaces of bitumen, paints or oil and resin compounds and the like, which although useful for waterproofing the surfaces of wood, often do not serve in filling the pores of rough surfaces of masonry to a degree sufficient to insure reliability of water shedding or moisture deflecting qualities under all conditions, and from the decorative standpoint such coating compounds frequently prove of an unsatisfactory character as the coating on relatively short exposure becomes unsightly through the action of the weather.

In superstructural waterproofing, that is the treatment of walls above ground, it becomes necessary to insulate or dampproof an inner plastered surface from an outer weather exposed wall, and the present practice involves three methods, viz., that of furring, lining with hollow brick, and coating with a bituminous paint. By the latter method of superstructural dampproofing, a bituminous composition is applied to the inner surface of the wall, by means of brush or sprayer. The coating material is so prepared that plaster will bond to it, in this way insulating the plaster from the wall; a procedure which has several advantages over the preceding methods of furring or lining with hollow block or tile, among which advantages may be mentioned the saving in cost because of the simplicity of the process, the insulating efficiency secured by reason of locking the pores in the masonry with an air proof and dampproof compound, and the resultant economy in space as contrasted with the space necessitated in furring and lathing. The one disadvantage of the brush application of a bituminous paint or coating of this character to form a waterproof sheath between masonry and plaster is that since the coating is applied by brushing it cannot be made to form a continuous impervious film over ragged uneven surfaces, as the brush is not able to adequately reach the interstices or depressions in many cases. Neither can the application of such compositions by means of spraying devices be recommended for the reason that under the circumstances a relatively large proportion of thinning material is required to give the composition the required degree of fluidity to spray freely and properly. Thus the bituminous base on which depends waterproofing efficiency is greatly diluted and is correspondingly less effective. Then too, while the work is being carried out, the building in large measure is open on all sides and the slightest breeze will disturb the path of travel of the fine spray, causing a considerable proportion of the atomized material to drift away, often to deposit in places where not desired, and thus involving an additional expense to remove the material there deposited.

By my invention a fluent composition is secured which overcomes the disadvantage of the brushed-out coating, while possessing the advantages thereof, which composition may be troweled on a surface and worked into its irregularities, which will adhere well even to damp masonry, and which will form a continuous waterproofing sheath over any surface, however rugged, uneven or irregular such surface may be.

My method of preparation enables a composition to be produced in the form of a heavy paste, thick and coherent enough to not show any troublesome drip under the trowel, of sufficient body to not sag after proper application, but in spite of its rather high measure of consistency, spreading well under the applying tools. Moreover the composition in its preferred form exhibits a desirable quality of plasticity, enabling application with satisfactory results to expansion joints in concrete, as said composition will expand and contract with the movement of the concrete slab. In a similar manner, used under roof tile, water penetration can be prevented, simply by embedding the laps of Spanish tile, hip rolls, finials, crestings of shingle tile, and the like in a layer of the plastic composition. Repairs in roofs, whether of slate, tin, felt, tile, built up slag or gravel strata, may be made simply by troweling on a quantity of said composition to fill and cover the leaky areas. Likewise for covering openings where flashing enters the wall, pointing around flashing, for cementing cap to flashing on the underside, the composition may be used to advantage especially on damp surfaces where ordinary cements fail to properly adhere. Used as a covering for concrete roofs and the like, the composition acts like an artificial rubber blanket, expanding and contracting with the movement of the structure beneath and affording a maximum of protection to the concrete surface. Furthermore the blanketed surface, can if desired, be painted over, as paint and similar coating materials will adhere to the surface of the composition. Besides serving as a leak plug for roofs, secure protection against water penetration around window frames can be provided by applying the composition to openings under the hanging stile, filling in between frame and wall on stucco exteriors, on in any rift or crevice in the window setting. Thus the difficulty of protecting such portions of structures from driving storms is effectually overcome. While plastic enough to be used for filling in spaces and slushing around window frames, the composition trowels in place neatly without sagging and sets without becoming hard and brittle, which is an advantageous feature.

The composition may be prepared without the use of any volatile inflammable thinner, so that in the handling and application of the product, the fire risk is negligible.

Where floor arch and wall join, if the ceilings are to be preserved from dampness, a waterproofing material should be present at such junction. In order to carry their loads, the floor arches become a part of the bearing wall, or must be supported by the steel frame when curtain walls are used. Hence the air space created by furring blocks or by lath and furring strips cannot be continuous. Wherever this is the case, and it is so in every fireproof structure, or for that matter in wooden construction, moisture permeating the outer shell of the building at the point where the arch joins the wall, penetrates the floor arch for some distance at least and affects the plastered ceiling. The arches, being usually made of hollow tile or "strongly diluted" concrete, become an easy prey to the attacks of rain storms and are quickly saturated with moisture at the junction points, causing the ceiling to become stained and discolored. From thence, if furred construction is employed, the moisture will travel down the wall along the surfaces inclosing the air space, saturating and disintegrating the plaster. When then, it becomes desirable to use furring, as often is the case, especially if the interior plan of the building requires the trim to be set out from the wall, and the expense of supplementing the effect of the air space by a water insulating coating throughout, is an obstacle, it becomes necessary to seal the space at the junction point where furring and arch meet, as this is the vulnerable point of attack from dampness. My plastic waterproof troweling composition or fluent structural-dampproofer applied at this point overcomes the difficulty experienced with this form of construction, and due to the marked adhesiveness to damp walls exhibited by some forms of said composition, a remarkable thorough sealing effect with a minimum of coated area.

As indicated, the walls in new construction are always more or less damp and this moisture has a tendency to repel a coating of ordinary bituminous, asphaltic or coal tar mixtures, the action reminding one of the repellent effect of water by a greasy surface. Wherever moisture is present, the coating film does not bond or key to the surface and after setting may be totally removed with relative ease. The present invention aims to provide a composition, which although possessing an unusually pronounced waterproofing character, is nevertheless in a form capable of ease of application to surfaces which contain moisture.

My plastic troweling waterproof sealing cement or fluent structural-dampproofer comprises a heavy-bodied oil basis and the like, containing a vulcanized oil or suitably sulfureted oil, more particularly a semi or slightly vulcanized oil or sulfureted material, preferably a vegetable oil. For the oil basis, I may use as raw material, any of the drying oils, as linseed, perilla, Chinese wood or tung oil and the like, or semi-drying oils including fish, corn, cotton, rape and like oils. Non-drying oils as petroleum, asphaltic oils and malthas may be employed to some extent as additions or diluents, or in some cases may form the entire oils basis if desired, although asphaltic and other mineral oils require a modified treatment to give results approaching those obtained from vegetable drying oils, and are not recommended except for coating foundation walls and underneath plaster, etc., where such materials are not objectionable. Mineral oils containing a considerable proportion of unsaturated constituents are preferably used in the preparation of an oil basis of this character as the combination or absorption of the sulfur or equivalent material by such mineral oils appears to be of a nature differing from that occurring with oils of zero iodin number. In fact an oil having an iodin number of 25 to 75 is recommended for this purpose.

As an illustrative formula, which is of course capable of considerable modification, the following is given;—100 gallons of wood oil is placed in an iron kettle and is carefully heated to 400° F. At this temperature 3 pounds of sulfur are cautiously introduced and reaction allowed to take place, which change is usually accompanied with effervescence. If necessary, the kettle may be withdrawn from the fire and the reaction allowed to spend itself with heating at this time; after the action has advanced to a sufficient degree the kettle is returned to the fire and heated to 600° F. at which temperature the contents are held until a viscid heavy-molasses-like product is obtained, which further thickens after cooling. While still warm, the mass is placed in a dough mixer or similar agitator and is kneaded with the pigment or filling material to produce the product of the present invention in a preferred embodiment, enabling application to surfaces by knifing or troweling. Beside the pigment, filling or extending material may be added, provided the consistency be not increased to an excessive degree; or the pigment may be omitted. Among the fillers which may be employed are bodies of the nature of talc or ground soapstone, whiting, barytes, China clay and kaolin, silex and the like. The filling material as well as the pigment should be of a sulfur-fast nature, that is, it should be compatible with the sulfureted oil. A formula meeting these requirements is as follows: sulfureted oil, 10 pounds; calcium carbonate, 3 pounds; magnesium silicate, 3 pounds; zinc oxid, 3 pounds. This affords a buff colored mass which may be colored by the addition of pigments of a satisfactory degree of compatibility. To get a gray, 2 ounces of lampblack are added to the above composition. A red is obtained by the addition of 2 pounds of red oxid of iron pigment. One pound of ultramarine added to the above gives a green mass. Mineral brown, in proportion of two pounds, to the above batch affords a desirable shade of brown. To produce a black, the zinc oxid may be substituted by a like amount of mineral black and one pound of gas black.

The gray colored composition is adapted for filling in spaces and slushing around window frames and the other colors are suited for embedding tile and pointing around flashing. All these colors and others may be used in coating the exposed surfaces of masonry structures. When lead pigments which are blackened or discolored by sulfur are used, the discoloration may sometimes be turned to advantage to secure some of the darker shades, thus affording compatible results for the specific purpose at hand.

By the present invention in its preferred form sulfur is desirably combined with the oil to form definite or indefinite sulfureted compounds, usually with somewhat lower iodin numbers, than the original oil, but I do not wish ordinarily by the sulfureting operation, to decrease the iodin numbers more than about five to twenty per cent. as I am not endeavoring to produce insoluble and solid rubber substitutes or factice, but rather a composition capable of troweling and having the property of adhering well to masonry surfaces, including stone, brick, cement, concrete, concrete block, stucco and other surfaces or even to metallic bodies.

I am aware of the use of rubber substitutes made from vulcanized oil in which a large proportion of sulfur to cause solidification is employed and do not lay claim to a product or products of this character, as these are of an elastic character and not capable of being troweled.

The small amount of sulfur employed in my preferred composition and the results achieved by boiling the sulfureted product at the temperatures specified afford a material which has been found to retain its yielding qualities or plasticity-retentive properties for an indefinite period. By boiling after sulfurizing a series of reactions appear to progress, including polymerization and other changes, which tend to accomplish the beneficial results arrived at herein.

What I claim is;—

1. A plastic troweling waterproof composition comprising a slightly-vulcanized drying oil and finely-divided solid material; said composition being of an adhesive nature so as to readily adhere to masonry surfaces and being capable of remaining for an indefinite period in a plastic condition.

2. A plastic troweling waterproof composition comprising slightly-vulcanized Chinese wood oil of a heavy fluent consistency and finely-divided solid material; said composition being capable of remaining plastic for an indefinite period on exposure in thin layers.

3. A plastic troweling waterproof composition comprising a slightly-vulcanized and boiled vegetable oil and a compatible pigment; said composition being of a very sticky, tacky and adhesive character.

4. A plastic troweling waterproof composition comprising a slightly vulcanized drying oil and a pigment compatible with sulfur; said composition being of a sticky tacky nature so as to readily adhere to masonry surfaces.

5. A plastic troweling waterproof composition comprising slightly-vulcanized Chinese wood oil of a heavy fluent consistency and a compatible pigment; said composition being of a tacky nature so as to readily adhere to masonry surfaces.

6. A plastic troweling waterproof composition comprising vulcanized Chinese wood oil and a pigment, said composition being capable of application to surfaces by means of a trowel or similar spreading tool; and being capable of adhering to such surfaces under extreme weather conditions because of its tacky and non-hardening nature.

Signed at New York city in the county of New York and State of New York this 7th day of November A. D. 1914.

AARON C. HORN.

Witnesses:
ANNIE GARRIGAN,
J. BROKER.